United States Patent
Kanegae et al.

(10) Patent No.: US 11,124,142 B2
(45) Date of Patent: Sep. 21, 2021

(54) PASSENGER PROTECTION APPARATUS

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 53 days.

(21) Appl. No.: 16/742,100

(22) Filed: Jan. 14, 2020

(65) Prior Publication Data
US 2020/0298781 A1 Sep. 24, 2020

(30) Foreign Application Priority Data

Mar. 22, 2019 (JP) .............................. JP2019-054454

(51) Int. Cl.
| | |
|---|---|
| *B60R 21/013* | (2006.01) |
| *B60R 21/206* | (2011.01) |
| *B60R 21/01* | (2006.01) |
| *B60R 21/233* | (2006.01) |
| *B60R 21/231* | (2011.01) |

(52) U.S. Cl.
CPC .......... *B60R 21/013* (2013.01); *B60R 21/206* (2013.01); *B60R 21/233* (2013.01); *B60R 2021/01238* (2013.01); *B60R 2021/23107* (2013.01)

(58) Field of Classification Search
CPC .... B60R 2021/0009; B60R 2021/0023; B60R 2021/0051; B60R 2021/0053; B60R 2021/01034; B60R 2021/01231; B60R 2021/01238; B60R 2021/161; B60R 2021/23107; B60R 2021/23161; B60R 2021/23169; B60R 21/013; B60R 21/205; B60R 21/206; B60R 21/233
See application file for complete search history.

(56) References Cited

U.S. PATENT DOCUMENTS

| | | | |
|---|---|---|---|
| 6,712,384 B2 | 3/2004 | Abe | |
| 9,902,359 B2 * | 2/2018 | Takeshita | ............. B60R 21/231 |

(Continued)

FOREIGN PATENT DOCUMENTS

JP 2003-034215 4/2003

*Primary Examiner* — Laura Freedman
(74) *Attorney, Agent, or Firm* — Smith, Gambrell & Russell, LLP

(57) ABSTRACT

A passenger protection apparatus for a vehicle includes a first airbag configured to deploy from a front part of the vehicle toward a passenger, a second airbag provided under the first airbag and configured to deploy toward the passenger, and a collision type detector configured to detect a collision or collision possibility of the vehicle and detect a collision type. The collision type detector detects a first type of collision and a second type of collision. The second airbag deploys in a first deployment configuration when the first type of collision is detected, and deploys in a second deployment configuration when the second type of collision is detected. The second airbag deployed in the second deployment configuration contacts an in-vehicle component provided in a vehicle compartment, and the second airbag in contact with the in-vehicle component guides the first airbag in a direction in which the collision load is applied.

13 Claims, 6 Drawing Sheets

(56) References Cited

U.S. PATENT DOCUMENTS

| | | | |
|---|---|---|---|
| 9,956,937 B2 * | 5/2018 | Jindal | .................. B60R 21/205 |
| 2003/0015861 A1 | 1/2003 | Abe | |
| 2005/0035577 A1 * | 2/2005 | Barko | .................... B60R 21/33 |
| | | | 280/730.2 |
| 2020/0298780 A1 * | 9/2020 | Kanegae | ............ B60N 2/42736 |

* cited by examiner

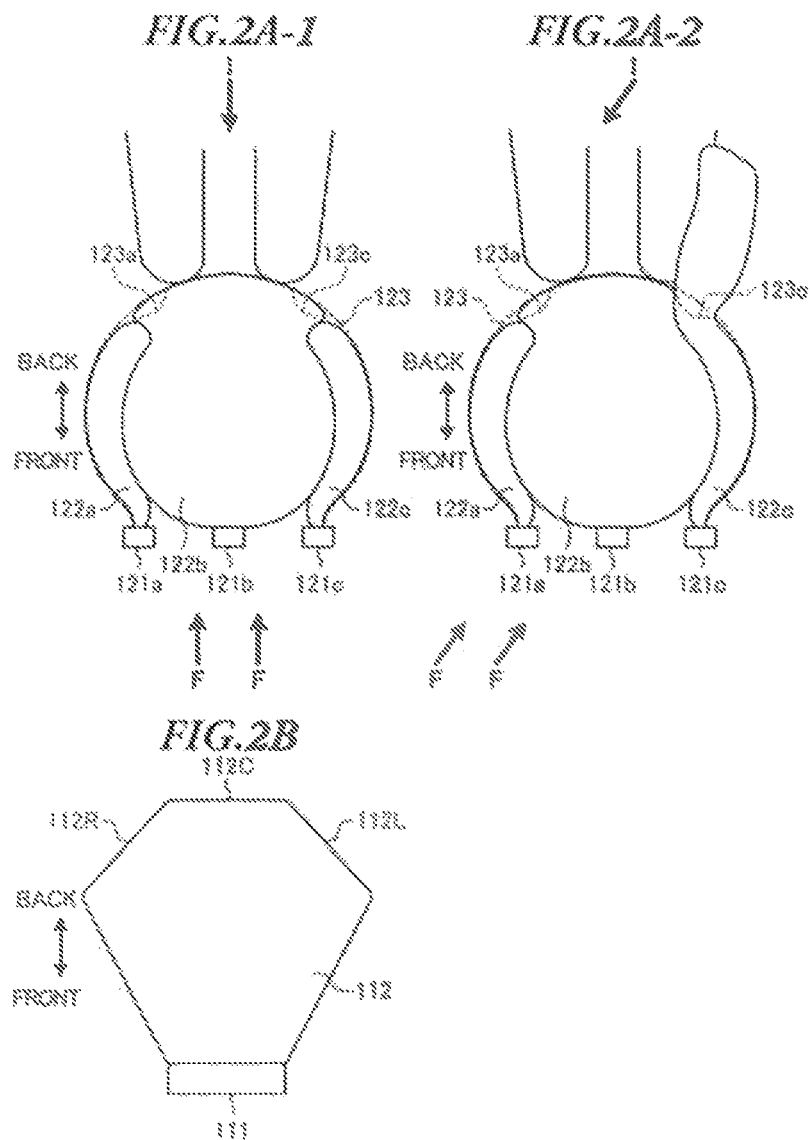

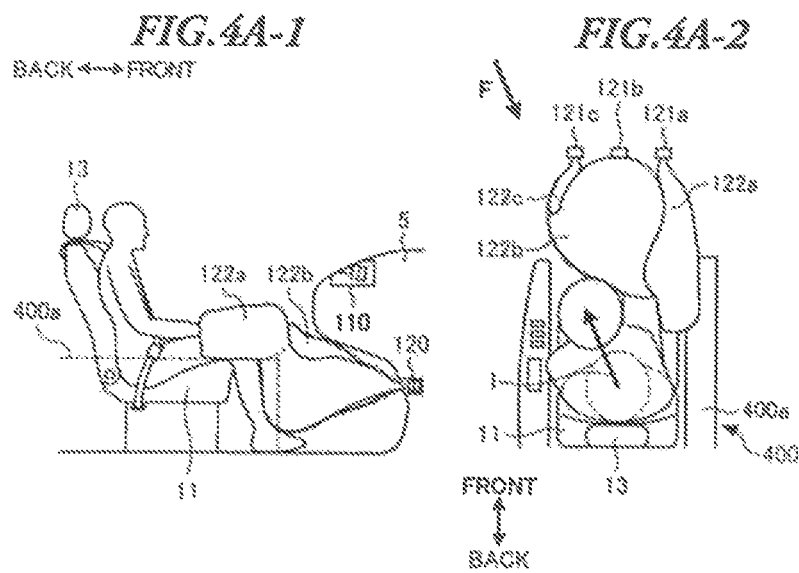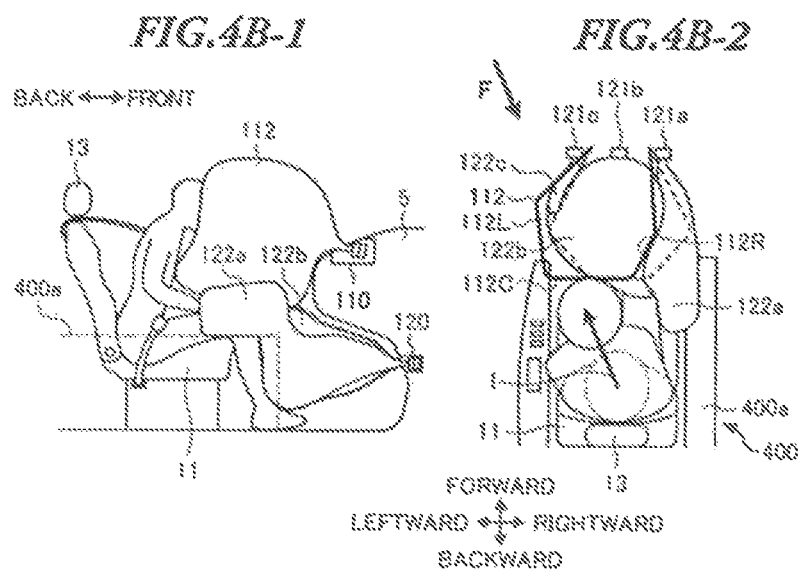

PASSENGER PROTECTION APPARATUS

CROSS-REFERENCE TO RELATED APPLICATIONS

The present application claims priority from Japanese Patent Application No. 2019-054454 filed on Mar. 22, 2019, and the entire contents of which are hereby incorporated by reference.

BACKGROUND

The disclosure relates to a passenger protection apparatus.

In order to protect a passenger from a collision and so forth, an airbag apparatus has been used as a passenger protection apparatus in a vehicle such as an automobile. This airbag apparatus typically includes an impact sensor, an inflator, an airbag, a controller, and so forth. When the impact sensor detects the impact of a collision such as a front collision, the airbag apparatus outputs a detection signal to the controller; the controller sends an operation signal to the inflator; and the inflator generates gas and supplies the gas to the airbag. Upon receiving the gas from the inflator, the airbag instantaneously expands and deploys in front of a passenger. By this means, the airbag with an inner gas pressure receives the body of the passenger moving forward due to the impact, and deflates absorbing the energy of the motion of the passenger. In this way, the airbag can absorb the sudden forward movement of the passenger due to the impact of the front collision of the vehicle, and therefore it is possible to secure the safety of the passenger.

In addition, there has been known an airbag apparatus that includes an airbag configured to expand in front of the upper body of the passenger and a knee bag configured to expand in front of the legs of the passenger to sufficiently protect the passenger, which is disclosed, for example, in Japanese Unexamined Patent Application Publication (JP-A) No. 2003-34215. In this airbag apparatus, the upper end of the expanded knee bag is located equal to or more than 50 mm higher than the lower end of the expanded airbag, so that the upper end of the expanded knee bag and the lower end of the expanded airbag overlap with one another in the front-to-back direction of the vehicle. By this means, it is possible to insert the lower end of the airbag into the gap between the expanded knee bag and the passenger. Therefore, even though the lower end of the airbag is pushed by the passenger, it is possible to prevent the airbag from retracting, and consequently to prevent the low back of the passenger from moving forward.

SUMMARY

An aspect of the disclosure provides a passenger protection apparatus for a vehicle. The apparatus includes a first airbag, a second airbag, and a collision type detector. The first airbag is configured to deploy from a front part of the vehicle toward a passenger. The second airbag is provided under the first airbag and configured to deploy toward the passenger. The collision type detector is configured to detect a collision or collision possibility of the vehicle and detect a collision type. The collision type detector can detect a first type of collision, and a second type of collision where a collision load is applied more outward in a vehicle width direction than the first type of collision. The second airbag deploys in a first deployment configuration when the first type of collision is detected, and deploys in a second deployment configuration different from the first deployment configuration when the second type of collision is detected. The second airbag deployed in the second deployment configuration contacts an in-vehicle component provided in a vehicle compartment, and then the second airbag in contact with the in-vehicle component guides the first airbag in a direction in which the collision load is applied.

An aspect of the disclosure provides a passenger protection apparatus for a vehicle. The apparatus includes a first airbag, a second airbag, and circuitry. The first airbag is configured to deploy from a front part of the vehicle toward a passenger. The second airbag is provided under the first, airbag and configured to deploy toward the passenger. The circuitry is configured to detect a collision or collision possibility of the vehicle and detect a collision type. The circuitry can detect a first type of collision, and a second type of collision where a collision load is applied more outward in a vehicle width direction than the first type of collision. The second airbag deploys in a first deployment configuration when the first type of collision is detected, and deploys in a second deployment configuration different from the first deployment configuration when the second type of collision is detected. The second airbag deployed in the second deployment configuration contacts an in-vehicle component provided in a vehicle compartment, and then the second airbag in contact with the in-vehicle component guides the first airbag in a direction in which the collision load is applied.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 2A-1 and 2A-2 are plan views illustrating the deployed passenger protection apparatus;

FIGS. 2B is a front view illustrating the deployed passenger protection apparatus;

FIGS. 3A-1 and 3B-1 are side views illustrating a deployment process of the passenger protection apparatus for a second type of collision in a first collision direction;

FIGS. 3A-2 and 3B-2 are plan views illustrating the deployment process of the passenger protection apparatus for the second type of collision in the first collision direction;

FIGS. 4A-1 and 4B-1 are side views illustrating a deployment process of the passenger protection apparatus for the second type of collision in a second collision direction;

FIGS. 4A-2 and 4B-2 are plan views illustrating the deployment process of the passenger protection apparatus for the second type of collision in the second collision direction;

FIGS. 5B-1 and 5B-2 are front views illustrating the passenger protection apparatus for the second type of collision.

DETAILED DESCRIPTION

Figure 1:
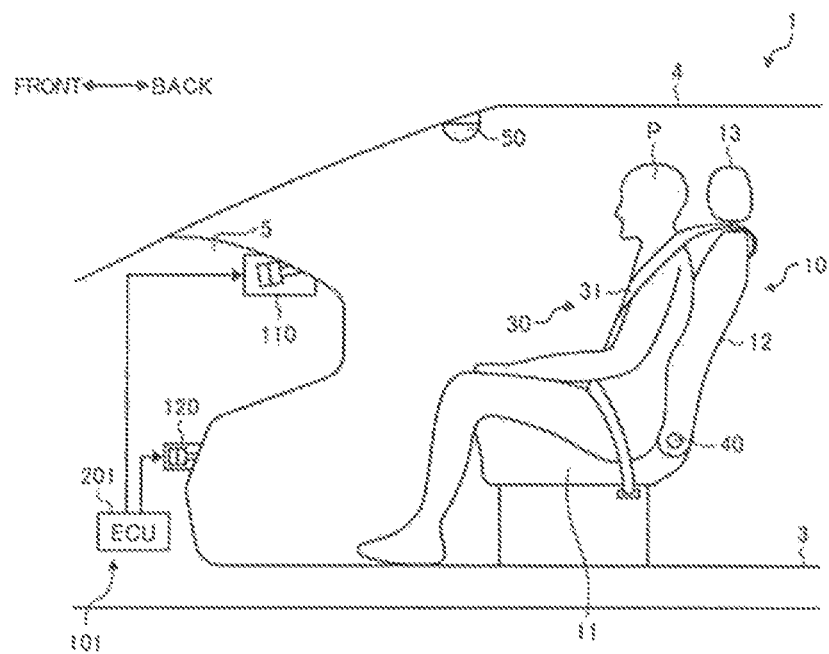
FIG. 1 is a cross-sectional view schematically illustrating part of a vehicle equipped with a passenger protection apparatus according to an embodiment of the disclosure.

In the following/ a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

The above-described conventional airbag apparatus disclosed in JP-A 2003-34215 can prevent the low back of the passenger from moving forward, but cannot sufficiently protect the head and the chest of the passenger depending on a collision type such as an oblique collision, and therefore it is expected to further improve the safety.

Figures 1, 3A:
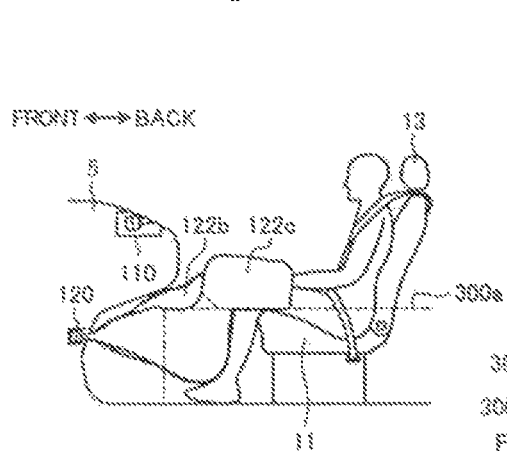
Figures 2, 3A:
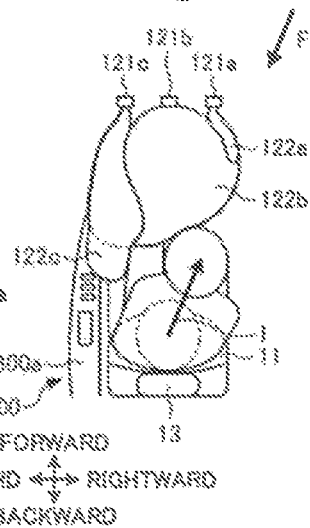
Figures 1, 3B:
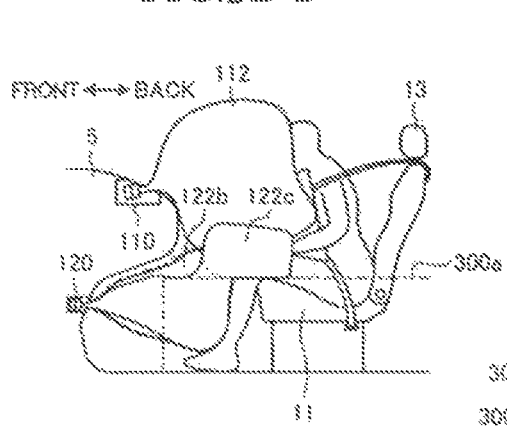
Figures 2, 3B:
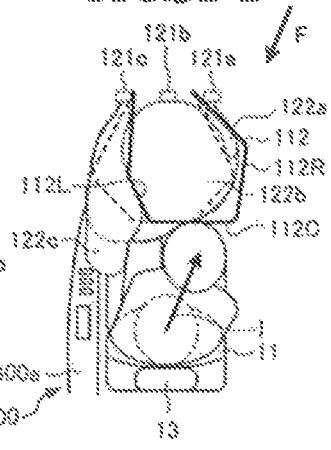
Figure 5A:
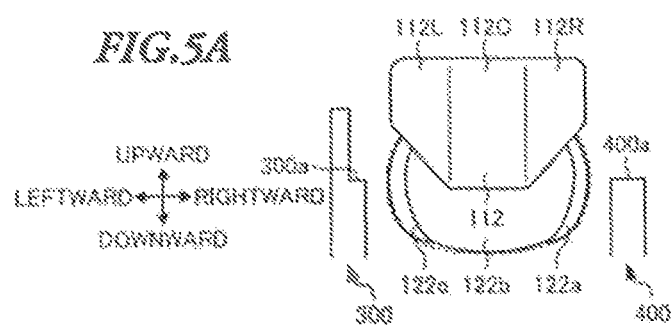
FIG. 5A is a front view illustrating the passenger protection apparatus for the first, type of collision.
Figures 1, 5B:
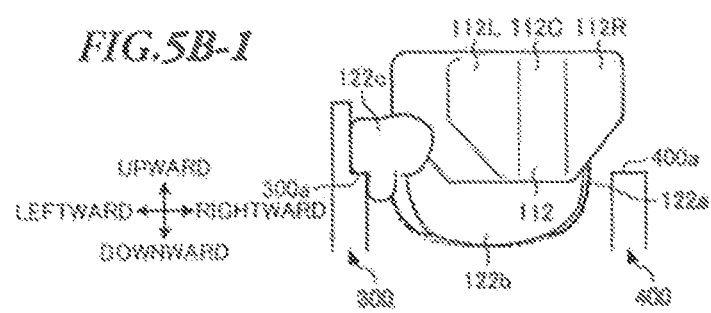
Figures 2, 5B:
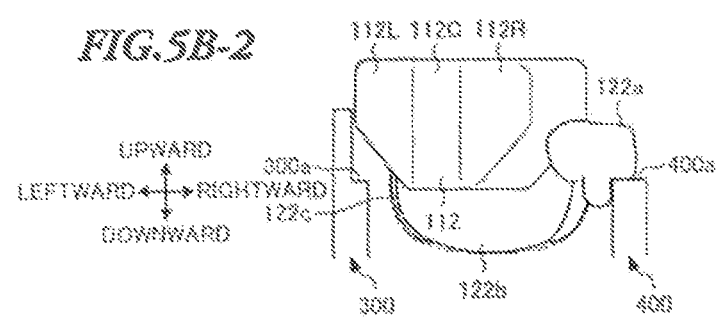
Figure 6:
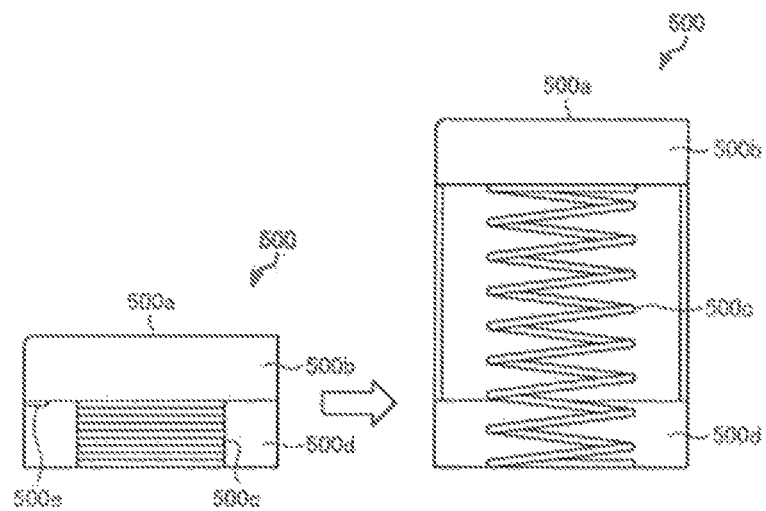
FIG. 6 schematically illustrates a biasing member provided in an in-vehicle component.

It is desirable to provide a passenger protection apparatus capable of sufficiently protect the head and the chest of a passenger to further improve the safety. FIG. 1 is a cross-sectional view schematically illustrating part of a vehicle equipped with a passenger protection apparatus. FIG. 2A-1 is a plan view illustrating a knee airbag device 120 deployed for a first type of collision. FIG. 2A-2 is a plan view illustrating the knee airbag device 120 deployed for a second type of collision. FIG. 2B is a plan view illustrating a deployed upper body airbag device 110. FIG. 3A-1 is a side view illustrating the knee airbag device 120 deployed for the second type of collision in the first collision direction. FIG. 3A-2 is a plan view illustrating the knee airbag device 120 deployed for the second type of collision in the first collision direction. FIG. 3B-1 is a side view illustrating the upper body airbag device 110 and the knee airbag device 120 deployed for the second type of collision in the first collision direction, which particularly illustrates the positional relationship between the passenger and the airbag devices. FIG. 3B-2 is a plan view illustrating the upper body airbag device 110 and the knee airbag device 120 deployed for the second type of collision in the first collision direction, which particularly illustrates the positional relationship between the passenger and the airbag devices. FIG. 4A-1 is a side view illustrating the knee airbag device 120 deployed for the second type of collision in a second collision direction. FIG. 4A-2 is a plan view illustrating the knee airbag device 120 deployed for the second type of collision in the second collision direction. FIG. 4B-1 is a side view illustrating the upper body airbag device 110 and the knee airbag device 120 deployed for the second type of collision in the second collision direction, which particularly illustrates the positional relationship between the passenger and the airbag devices. FIG. 4B-2 is a plan view illustrating the upper body airbag device 110 and the knee airbag device 120 deployed for the second type of collision in the second collision direction, which particularly illustrates the positional relationship between the passenger and the airbag devices. FIG. 5A is a front view illustrating the upper body airbag device 110 and the knee airbag device 120 deployed for the first type of collision. FIG. 5B-1 is a front view illustrating the upper body airbag device 110 and the knee airbag device 120 deployed for the second type of collision in the first collision direction. FIG. 5B-2 is a front view illustrating the upper foody airbag device 110 and the knee airbag device 12C deployed for the second type of collision in the second collision direction. FIG. 6 schematically illustrates a biasing member of an in-vehicle component such as a door trim 300 and a center console 400. Here, with the present embodiment, "front" and "back" is defined based on the state where a passenger P sits on a seat 10 described later (based on the point, of view of the passenger P). That is, "front" means the front in a vehicle 1, and "back" means the back in the vehicle 1. In addition, "left" and "right" are defined with respect to the lateral direction (vehicle width direction) of the vehicle 1. Moreover, "upper" and "lower" are defined with respect to the up-and-down direction (height) of the vehicle 1. Further, "F" denotes a collision load, and "I" denotes inertia.

<Configuration of Vehicle 1>

As illustrated in FIG. 1, a passenger compartment (vehicle compartment) of the vehicle 1 includes an under floor 3 provided in its lower part and a roof 4 provided in its upper part. A seat 10 is provided on the under floor 3.

A passenger P of the vehicle 1 sits on the seat 10. The seat 10 includes a seat cushion (seat bottom) 11 on which the hip and thighs of a passenger P rest, a seat back (backrest) 12 configured to recline, and a head rest (head portion) 13 configured to support the head of the passenger P. Moreover, the vehicle 1 is equipped with a passenger protection apparatus 101. Hereinafter, the passenger protection apparatus 101 for the seat next to the driver will be described.

Configuration of Passenger Protection Apparatus 101

The passenger protection apparatus 101 mainly includes the upper body airbag device 110, the knee airbag device 120, and an electronic control unit (hereinafter referred to as "ECU") 201. Here, the upper body airbag device 110 and the knee airbag device 120 are provided in the dashboard 5. In one embodiment, the ECO 201 may serve as a "collision speed detector" configured to detect a collision and collision possibility of the vehicle 1, and detect the collision speed. In one embodiment, the ECU 201 may serve as a "collision type detector" configured to detect a collision and collision possibility of the vehicle 1, and detect a collision type such as a front collision, an oblique collision and a lateral collision. Moreover, in one embodiment, the ECU 201 may serve as an airbag deployment control unit (hereinafter referred to as "ACU") that may serve as a "deployment controller". In one embodiment, the ECU 201 also may serve as an "airbag deployment device". The collision speed detector and the ACU may be provided separately from the ECU 201.

<Upper Body Airbag Device 110 >

The upper body airbag device 110 is controlled by the ECU 201 (ACU) to protect the head and the chest of the passenger P. The upper body airbag device 110 includes an upper body inflator 111 and the upper body airbag body 112 (see FIG. 2B).

<Upper Body Inflator 111>

The upper body inflator 111 ignites explosives upon receiving an actuating signal sent based on collision detection or collision possibility of the vehicle 1 by the ECU 201, and generates gas by the chemical reaction due to combustion. The gas generated by the upper body inflator 111 is injected into the upper body airbag body 112. The upper body inflator 111 may include a plurality of inflators, and set the number of inflators to generate gas based on the collision speed calculated by the ECU 201. In addition, the upper body inflator 111 may be configured to adjust an amount of gas to be generated, and control the amount of gas to be generated depending on the collision speed detected by the ECU 201.

<Upper Body Airbag Body 112>

The upper body airbag body 112 has a pouch shape into which the gas is injected by the upper body inflator 111. When the upper body airbag body 112 is not actuated, it is compactly folded. When the gas is injected from the upper body inflator 111 into the upper body airbag body 112, the upper body airbag body 112 deploys from the dashboard 5 toward the seat 10 to absorb the impact of a collision of the vehicle 1 or the head and the chest of the passenger P. Here, with the present embodiment, the expansion and deployment of the upper body airbag body 112 and knee airbag bodies 122a to 122c described later will be simply referred to as "deployment."

Moreover, as illustrated in FIG. 2B, the deployed upper body airbag body 112 is polygonal in a plane view of the vehicle 1, and the upper body airbag body 112 includes a passenger protection surface 112C configured to protect the head and the chest of the passenger P, and inclined surfaces 112L and 112P. Here, the reason why the upper body airbag body 112 has this shape will be described later.

<Knee Airbag Device 120>

The knee airbag device 120 is controlled by the ECU 201 (ACU) to mainly protect the legs, for example, the knees and the shins of the passenger P. In addition, the knee airbag device 120 includes knee inflators 121a to 121c and knee airbag bodies 122a to 122c (see FIGS. 2A-1 and 2A-2).

When the passenger protection apparatus 101 is actuated, the space between the passenger P and the dashboard 5 (vehicle equipment) is filled with the upper body airbag body 112 and at least one of the knee airbag bodies 122a to 122c. Here, when the ECU 201 detects a collision or collision possibility of the vehicle 1, first the knee airbag device 120 is actuated to fill the space between the passenger P and the dashboard 5 (vehicle equipment), in order to restrict the low back, of the passenger P from moving in the front-to-back direction. Then, the upper body airbag device 110 is actuated, for example, split seconds after the knee airbag device 120 is actuated, so that the upper body airbag body 112 protects the passenger restricted from moving the low back in the front-to-back direction in its appropriate position.

<Knee Inflators 121a to 121c<

The knee inflators 121a to 223c ignite explosives upon receiving an actuating signal sent based on collision detection or collision possibility of the vehicle 1 by the ECU 201, and generate gas by the chemical reaction due to combustion. The gas generated by the knee inflator 121a is injected into the knee airbag body 122a, the gas generated by the knee inflator 121b is injected into the knee airbag body 122b, and the gas generated by the knee inflator 121c is injected into the knee airbag body 122c.

Here, as illustrated in FIGS. 2A-1 and 2A-2, the knee airbag device 120 includes knee airbag bodies 122a to 122c as a plurality of sub-airbags in an outer bag 123, and break portions 123a and 123c are formed in the outer bag 123. Then, when the gas generated by the knee inflator 121a is injected into the knee airbag body 122a, the knee airbag body 122a is deployed to break the break portion 123a, so that the knee airbag body 122a protrudes outward from the outer bag 123. Likewise, when the gas generated by the knee inflator 121c is injected into the knee airbag body 122c, the knee airbag body 122c is deployed to break the break portion 123c, so that the knee airbag body 122c protrudes outward from the outer bag 123. In one embodiment/ the knee airbag body 122b may serve as a "first sub-airbag", and the knee airbag body 122a and the knee airbag body 122c may serve as a "second sub-airbag".

Note that the outer bag 123 is configured to essentially serve as a cover for the knee airbag body 122, and is not deployed directly by an inflator. Here when the knee airbag body 122b is deployed, the outer bag 123 is pushed by the knee airbag body 122b and deployed toward the seat 10. Here, the outer bag 123 may not necessarily be provided, and the knee airbag bodies 122a, 122b and 122c may be exposed.

<Knee Airbag Bodies 122a to 122c>

The knee airbag bodies 122a to 122c have a pouch shape into which the gas is injected by the knee inflators 121a to 121c. When the knee airbag bodies 122a to 122c are not actuated, they are compactly folded. In addition, when the gas is injected from the knee inflators 121a to 121c, the knee airbag bodies 122a to 122c deploy from the dashboard 5 toward the seat 10.

The knee airbag device 120 varies the knee airbag bodies 122a to 122c to be deployed depending on the collision type. For example, the knee airbag device 120 deploys the knee airbag body 122b for the first type of collision, but does not deploy the knee airbag bodies 122a and 122c. Meanwhile, for the second type of collision, the knee airbag device 120 deploys the knee airbag body 122b, and further deploys the knee airbag body 122a or 122c depending on the collision direction. Here, with the present embodiment, the first type of collision is "front collision", and the second type of collision is "oblique collision." In addition, when "front collision" as the first type of collision occurs, a collision load indicated by, for example/arrows "F" illustrated in FIG. 2A-1 is applied. Meanwhile, when "oblique collision" as the second type of collision occurs, a collision load indicated by arrows "F" illustrated in FIG. 2A-2 is applied. That is, the collision load due to "oblique collision" as the second type of collision is applied more outward in the vehicle width direction than "front collision" as the first type of collision.

Here, for the first type of collision, the knee air bag body 122b protects the legs of the passenger P as illustrated in FIG. 2A-1, and, for the second type of collision, the knee airbag body 122b and one of the knee airbag body 122a and 122c protect the legs of the passenger P. For example, the knee airbag body 122b protects the knees and the shins of the passenger P from the front, and the knee airbag body 122c protects the knee from the side and the shin from the front.

<ECU 201>

The ECU 201 is configured to control the entire vehicle 1. The ECU 201 includes a CPU (central processing unit), a ROM (read only memory) configured to store control programs executed by the CPU, data tables, commands and data, a RAM (random access memory) configured to temporarily store data, an EEPROM (electrically erasable and programmable read only memory) which is a type of non-volatile rewritable memory, and an I/O interface circuit. The ECU 201 controls the entire vehicle 1.

The ECU 201 performs collision possibility and collision detection based on information from an acceleration sensor (G sensor), a distance sensor, an impact sensor (pressure sensor) and so forth, and detects the collision speed. In one embodiment, the ECU 201 may serve as a "collision speed detector 7". The acceleration sensor, the distance sensor, and the impact sensor may be provided outside and separately from the ECU 201. In addition, the ECU 201 may acquire the information inputted from those sensors based on the image data inputted from a car-mounted camera 50.

Moreover, the ECU 201 performs collision possibility and collision detection based on information from an outside car camera, a millimeter-wave radar, a steering wheel angle sensor and so forth, and detects the collision type, for example, whether the first type of collision or the second type of collision, and the collision direction, for example, whether the first collision direction or the second collision direction. In one embodiment, the ECU 201 may serve as a "collision type detector".

In addition, the ECU 201 determines the knee airbag bodies 122*a* to 122*c* to be deployed based on the detected collision type and collision direction. That is, for the first type of collision, the ECU 201 determines to deploy the knee airbag body 122*b;* for the second type of collision in the first collision direction, the ECU 201 determines to deploy the knee airbag bodies 122*b* and 122*c*; and for the second type of collision in the second collision direction, the ECU 201 determines to deploy the knee airbag bodies 122*b* and 122*a*. Here, with the present embodiment, the first collision direction means "right front" of the vehicle 1, and the second collision direction means "left front" of the vehicle 1.

Moreover, the ECU 201 actuates the upper body inflator 111 of the upper body airbag device 110, and the knee inflators 121*a* to 121*c* corresponding to the knee airbag bodies 122*a* to 122*c* which have been determined as the knee airbag bodies to be deployed, to deploy the upper body airbag body 112 and the knee airbag bodies 122*a* to 122*c*, respectively. In one embodiment, the ECU 201 may serve as a "deployment controller".

In addition, the ECU 201 also includes a seat belt device 30, a posture correction device 40, and the car-mounted camera 50, which have functions to directly or indirectly protect the passenger P.

<Seat Belt Device 30>

The seat belt device 30 includes a webbing 31, a retractor, a wrap anchor, a shoulder anchor, a tang, and a buckle (not illustrated). The webbing 31 is a kind of belt. One end of the webbing 31 is fixed to the wrap anchor provided on the lower part of the seat 10, and the other end of the webbing 31 is wound up by the retractor provided in the seat back 12 via the shoulder anchor.

The tang is a T-shaped connecting fitting to couple to the buckle. In addition, the tang has an insertion hole in which the webbing is inserted 31, and is configured to be able to slide on the webbing 31. The buckle is a coupling part to which the tang is removably coupled, and provided on one side of the seat cushion 11 of the seat 10 facing the inside of the vehicle width direction (the center side of the vehicle 1).

When the ECU 201 detects a collision, the retractor of the seat belt device 30 winds up the webbing 31 to draw the passenger P to the seat 10 (seat back 12 side). In addition, when the ECU 201 detects collision possibility, the retractor of the seat belt device 30 also winds up the webbing 31. Here, the seat belt device 30 may change the strength to wind up the webbing 31 by the retractor based on the collision speed and the collision type detected by the ECU 201. With the present embodiment, the seat belt device 30 is integrated with the seat 10, but this is by no means limiting. For example, the wrap anchor may be fixed to the side wall surface of a side sill; the shoulder anchor may be provided on the side wall of a center pillar; and the retractor may be provided in the center pillar.

Posture Correction Device 40

The posture correction device 40 is configured to change the angle of the seat back 12 to correct the posture of the passenger P to a predetermined posture, when the ECU 201 detects collision possibility. In addition, the posture correction device 40 may change the angle of the seat cushion 11, when the ECU 201 detects collision possibility. Moreover, the posture correction device 40 may change the angle of each of the seat back 12 and the seat cushion 11, when the ECU 201 detects collision possibility.

Moreover, a plurality of airbags may be provided in the seat back 12, and the posture correction device 40 may deploy a predetermined airbag to correct the posture of the passenger P, when the ECU 201 detects collision possibility. Furthermore, the posture correction device 40 may not necessarily be provided in the seat 10, but may be a predetermined airbag deploying from the front or the side of the vehicle 1 to correct the posture of the passenger P to & predetermined posture. Here, the posture correction of the passenger P is not limited to by the airbag or by adjusting the angle of the seat.

<Car-Mounted Camera 50>

The car-mounted camera 50 is configured to detect the sitting state such as a posture of the passenger P sitting on the seat 10. In one embodiment, the car-mounted camera 50 may serve as a "posture detector". For example, based on the information such as the sitting state of the passenger P obtained from the car-mounted camera 50, in addition to the collision type and the collision direction describe above, the ECU 201 may determine the knee airbag body 122 to be deployed. Here, the posture detector is riot limited to the car-mounted camera 50, but may detect the posture of the passenger P by using, for example, a pressure sensor provided in the seat sensor 10. In addition, the car-mounted camera 50 may detect the position of the passenger P sitting on the seat 10, for example, the position of the seat 10. In one embodiment, the car-mounted camera 50 may serve as a "passenger's position detector".

Alternatively, the car-mounted camera 50 may merely capture images of the inside of the passenger compartment including the passenger P, and output the data of the captured image to the ECU 201. Then, the posture and the sitting position of the passenger P may be detected by the ECU 201. Here, the car-mounted camera 50 may be used to capture the surrounding environment of the vehicle 1 and the inside of the vehicle compartment, in combination with a drive recorder camera configured to capture collision images of the vehicle 1.

<Deployment Configuration of Passenger Protection Apparatus 101>

Next, the deployment configuration of the passenger protection apparatus 101 will be described with reference to FIGS. 2A-1, 2A-2, and 2B.

FIG. 2A-1 is a plan view illustrating the knee airbag device 120 deployed for the first type of collision. For the first type of collision, the ECU 201 actuates the knee inflator 121*b* to inject the gas generated by the knee inflator 121*b* into the knee airbag body 122*b*. Here, the ECU 201 does net actuate the knee inflators 121*a* and 121*c* for the first type of collision. By this means, the knee airbag body 122*b* deploys from the dashboard 5 toward the seat 10. Then the knee airbag body 122*b* protects the legs of the passenger P. Here, the deployment configuration illustrated in FIG. 2A-1 represents "first deployment configuration."

FIG. 2A-2 is a plan view illustrating the knee airbag device 120 deployed for the second type of collision. Here, in FIG. 2A-2, it is assumed that the second type of collision in the first collision direction is detected. For the second type of collision in the first collision direction, the ECU 201 actuates the knee inflator 121*b* to inject the gas generated by the knee inflator 121*b* into the knee airbag body 122*b*, and also actuates the knee inflator 121*c* to inject the gas generated by the knee inflator 121*c* into the knee airbag body 122*c*. By this means, the knee airbag body 122*b* deploys from the dashboard 5 toward the seat 10, and the knee airbag body 122*c* deploys from the dashboard 5 toward the seat 10 and breaks the break portion 123*c* to protrude outward from the outer bag 123.

When it is assumed that the second type of collision in the second collision direction is detected (not illustrated in FIG. 2A-2), the knee airbag body 122*a* deploys from the dashboard 5 toward the seat 10 and breaks the break portion 123*a* to protrude outward from the outer bag 123. Here, the deployment configuration illustrated in FIG. 2A-2 represents "second deployment configuration."

FIG. 2B is a plan view illustrating the deployed upper body airbag device 110. The upper body airbag device 110 deploys the upper body airbag body 112 both for the first type of collision and the second type of collision as illustrated in FIG. 2B. In addition, the upper body airbag device 110 deploys the upper body airbag body 112 for the second type of collision both in the first collision direction and the second collision direction. That is, the knee airbag device 120 has two deployment configurations where the knee airbag body 122*b* is deployed and where the knee airbag bodies 122*b* and 122*a* are deployed, but the upper body airbag device 110 has one deployment configuration where the upper body airbag body 112 is deployed.

<Movement Process of Passenger Protection Apparatus 101>

Next/the movement process of the passenger protection apparatus 101 will be described with reference to FIGS. 3A-1 to 5B-2.

In FIGS. 3A-1 to 3B-2, it is assumed that the ECU 201 detects the second type of collision in the first collision direction. That is, when the second type of collision in the first collision direction is detected, the knee airbag bodies 122*b* and 122*c* are deployed. Here, the knee airbag body 122*c* is deployed to a predetermined level as illustrated in FIG. 3A-1, that is, deployed toward the upper part of the door trim 300 as illustrated in FIG. 3A-2, and is put on a rest portion 300*a* of the door trim 300 (contacts the door trim 300) as indicated by an alternate long and two short dashes line illustrated in FIG. 3A-1. Here, the knee airbag body 122*b* protects, for example, the knees and the shins of the passenger P from the front, and the knee airbag body 122*c* protects, for example, the knee from the side and the shin from the front. In addition, since it is assumed that the first collision direction is detected, a collision load indicated by "F" and inertia indicated by "I" are applied as illustrated in FIGS. 3A-2 and 3B-2.

FIG. 3B-1 is a side view illustrating the deployed upper body airbag device 110, and FIG. 3B-2 is a plan view illustrating the deployed upper body airbag device 110. Here, when the upper body airbag body 112 deploys toward the passenger P, first the inclined surface 112L of the upper body airbag body 112 contacts the knee airbag body 122*c* as illustrated in FIG. 3B-2. When the inclined surface 112L of the upper body airbag body 112 contacts the knee airbag body 122*c*, the expanded knee airbag body 122*c* is pushed back by, for example, the side surface of the door trim 300, so that a reaction force is applied in the inward direction of the vehicle 1 ("rightward" illustrated in FIG. 3B-2). By this means, the inclined surface 112L of the upper body airbag body 112 slidably contacts the knee airbag body 122*c*, while the upper body airbag body 112 moves in the inward direction of the vehicle 1 ("rightward" illustrated in FIG. 3B-2). That is, the knee airbag body 122*c* deployed to contact the door trim 300 guides the upper body airbag body 112 in the direction in which the collision load is applied. Here, the knee airbag body 122*c* is provided in the side (left side) opposite to the direction in which the collision load is applied ("rightward") in the vehicle width direction. In this case, the inclined surface 112L is formed in the upper body airbag body 112, and therefore it is possible to immediately move the upper body airbag body 112 in the inward direction of the vehicle 1 ("rightward" illustrated in FIG. 3B-2).

A dashed line illustrated in FIG. 3B-2 indicates the deployment position of the upper body airbag body 112 when the knee airbag body 122*c* is not deployed enough to be put on the rest portion 300*a* of the door trim 300. In this case, the head and the chest of the passenger P contacts the edge of the passenger protection surface 112C of the upper body airbag body 112, and therefore cannot be protected in an appropriate position of the passenger protection surface 112C. To address this, the knee airbag body 122*c* is deployed to a predetermined level as illustrated in FIG. 3A-1, that is, deployed toward the upper part of the door trim 300 as illustrated in FIG. 3A-2, and is put on the rest portion 300*a* of the door trim 300 (contacts the door trim 300) as indicated by an alternate long and two short dashes line illustrated in FIG. 3A-1. By this means, the upper body airbag body 112 is moved in the inward direction of the vehicle 1 ("rightward" illustrated in FIG. 3B-2). Consequently, it is possible to protect the head and the chest of the passenger P in the center of the passenger protection surface 112C of the upper body airbag body 112 as indicated by a chick line illustrated in FIG. 3B-2.

As described above, when the second type of collision in the first collision direction occurs, the knee airbag body 122*c* is deployed to protect the legs of the passenger P, and then the deployed knee airbag body 122*c* moves the upper body airbag body 112 in the direction in which the collision load is applied. By this means, it is possible to protect the head and the chest of the passenger P in the appropriate position of the passenger protection surface 112C. In addition, the upper body airbag body 112 is polygonal, and the inclined surface 112L of the upper body airbag body 112 slidably contacts the knee airbag body 122*c* as illustrated in FIG. 3B-2, and therefore it is possible to immediately move the upper body airbag body 112 in the inward direction of the vehicle 1 ("rightward" illustrated in FIG. 3B-2). Consequently, even though, for example, the passenger P moves at a high speed due to the inertia, it is possible to protect the head and the chest of the passenger P in the appropriate position of the passenger protection surface 112C.

In FIGS. 4A-1 to 4B-2, it is assumed that the ECU 201 detects the second type of collision in the second collision direction. That is, the knee airbag bodies 122*b* and 122*a* are deployed because the ECU 201 detects the second type of collision in the second collision direction. Here, the knee airbag body 122*a* is deployed to a predetermined level as illustrated in FIG. 4A-1, that is, deployed upward and beyond the center console 400 as illustrated in FIG. 4A-2, and is put on an rest portion 400*a* of the center console 400 (contacts the center console 400) as indicated by an alternate long and two short dashes line illustrated in FIG. 4A-1. The knee airbag body 122*b* protects, for example, the knees and the shins of the passenger P from the front, and the knee airbag body 122*a* protects, for example, the knee of the passenger P from the side and the shin from the front. In addition, since it is assumed that the second collision direction is detected, a collision load indicated by "F" and inertia indicated by "I" are applied as illustrated in FIGS. 4A-2.

FIG. 4B-1 is a side view illustrating the deployed upper body airbag device 110, and FIG. 4B-2 is a plan view illustrating the deployed upper body airbag device 110. Here, when the upper body airbag body 112 deploys toward the passenger P, first the inclined surface 112R of the upper body airbag body 112 contacts the knee airbag body 122a as illustrated in FIG. 4B-2. When the inclined surface 112R of the upper body airbag body 112 contacts the knee airbag body 122a, the expanded knee airbag body 122a is pushed back by, for example, the side surface of the center console 400, so that a reaction force is applied in the outward direction of the vehicle 1 ("leftward" illustrated in FIG. 4B-2). By this means, the inclined surface 112R of the upper body airbag body 112 slidably contacts the knee airbag body 122a, while the upper body airbag body 112 moves in the outward direction of the vehicle 1 ("leftward" illustrated in FIG. 4B-2). That is, the knee airbag body 122a deployed to contact the center console 400 guides the upper body airbag body 112 in the direction in which the collision load is applied ("leftward"). Here, the knee airbag body 122a is provided in the side (right side) opposite to the direction in which the collision load is applied ("leftward") in the vehicle width direction. In this case, the inclined surface 112R is formed in the upper body airbag body 112, and therefore it is possible to immediately move the upper body airbag body 112 in the outward direction of the vehicle 1 ("leftward" illustrated in FIG. 4B-2).

A dashed line illustrated in FIG. 4B-2 indicates the deployment position of the upper body airbag body 112 when the knee airbag body 122a is not deployed enough to be put on the rest portion 400a of the center console 400. In this case, the head and the chest of the passenger P contacts the edge of the passenger protection surface 112C of the upper body airbag body 112, and therefore cannot be protected in the appropriate position of the passenger protection surface 112C. To address this, the knee airbag body 122a is deployed to a predetermined level as illustrated in FIG. 4A-1, that is, deployed upward and beyond the center console 400 as illustrated in FIG. 4A-2, and is put on the rest portion 400a of the center console 400 (contacts the center console 400) as indicated by an alternate long and two short dashes line illustrated in FIG. 4A-1. By this means, the upper body airbag body 112 is moved in the outward direction of the vehicle 1 ("leftward" illustrated in FIG. 4B-2). Consequently, it is possible to protect the head and the chest of the passenger P in the center of the passenger protection surface 112C of the upper body airbag body 112 as indicated by a thick line illustrated in FIG. 4B-2.

As described above, when the second type of collision in the second collision direction occurs, the knee airbag body 122a is deployed to protect the knee of the passenger P, and then the deployed knee airbag body 122a moves the upper body airbag body 112 in the direction in which the collision load is applied. By this means, it is possible to protect the head and the chest of the passenger P in the appropriate position of the passenger protection surface 112C. In addition, the upper body airbag body 112 is polygonal, and the inclined surface 112R of the upper body airbag body 112 slidably contacts the knee airbag body 122a as illustrated in FIG. 4B-2, and therefore it is possible to immediately move the upper body airbag body 112 in the outward direction of the vehicle 1 ("leftward" illustrated in FIG. 4B-2). Consequently, even though, for example, the passenger P moves at a high speed due to the inertia, it is possible to protect the head and the chest of the passenger P in the appropriate position of the passenger protection surface 112C.

FIGS. 5A, 5B-1 and 5B-2 are front views illustrating the deployed upper body airbag device 110 and the deployed knee airbag device 120. FIG. 5A is a front view illustrating the deployed upper body airbag device 110 and the deployed knee airbag device 120 when the first type of collision occurs. For the first type of collision, the knee airbag device 120 deploys the knee airbag body 122b, and therefore the upper body airbag body 112 deploys straight toward the passenger P. Consequently, it is possible to protect the head and the chest of the passenger P in the appropriate position of the passenger protection surface 112C.

FIG. 5B-1 is a front view illustrating the deployed upper body airbag device 110 and the deployed knee airbag device 120 when the second collision in the first collision direction occurs. When the second type of collision in the first collision direction occurs, the knee airbag device 120 deploys the knee airbag bodies 122b and 122c. In particular, the knee airbag body 122c deploys as illustrated in FIGS. 3A-1, and 3A-2, and therefore the inclined surface 112L of the upper body airbag body 112 contacts the knee airbag body 122c, so that the upper body airbag body 112 moves in the inward direction of the vehicle 1 ("rightward" illustrated in FIG. 5B-1) . By this means, even though the second type of collision in the first collision direction occurs, it is possible to protect the head and the chest of the passenger P in the appropriate position of the passenger protection surface 112C.

FIG. 5B-2 is a front view illustrating the deployed upper body airbag device 110 and the deployed knee airbag device 120 when the second type of collision in the second collision direction occurs. When the second type of the collision in the second collision direction occurs, the knee airbag device 120 deploys the knee airbag bodies 122b and 122a. In particular, the knee airbag body 122a deploys as illustrated in FIGS. 4A-1 and 4A-2, and therefore the inclined surface 112R of the upper body airbag body 112 contacts the knee airbag body 122a, so that the upper body airbag body 112 moves in the outward direction of the vehicle 1 ("leftward" illustrated in FIG. 5B-2). By this means, even though the second type of collision in the second collision direction occurs, it is possible to protect the head and the chest of the passenger P in the appropriate position of the passenger protection surface 112C.

<Biasing Member 500>

FIG. 6 is a cross-sectional view schematically illustrates a biasing member 500. This biasing member 500 is provided in each of the rest portion 300a of the door trim 300 and the rest portion 400a of the center console 400. For example, an upper surface 500a of the biasing member 500 and the surface of each of the rest portions 300a and 400a are coplanar. Here, the biasing member 500 may be provided in a part or the whole of each of the rest portions. That is, the upper surface 500a of the biasing member 500 may constitute a part or the whole of the surface of each of the rest portions.

The biasing member 500 includes a cover 500b having the upper surface 500a, a spring member 500c coupled to the cover 500b at its one end, a housing 500d coupled to the other end of the biasing member 500c and configured to house the spring member 500c, and a switching member 500e capable of switching between "open state" and "closed state" of the cover 500b and the housing 500d. In addition, the biasing member 500 includes pillars at both sides in order to support the deployed knee airbag body 122a or 122c. Here, the switching member 500e can be switched between on and off by the ECU 201. For example, when the switching member 500e is turned on, the cover 500b becomes "open state", and on the other hand, when the switching member 500e is turned off, the cover 500b remains in "closed state." Then, when the cover 500b becomes "open state", the rest portion 300a of the door trim 300 or the rest portion 400a of the center console 400 moves into the vehicle compartment. That is, the rest portion 300a of the door trim 300, or the rest portion 400a of the center console 400 can be moved into the vehicle compartment by the biasing member 500.

<Use of Biasing Member 500>

An example of use of the biasing member 500 will be described. For example, the biasing member 500 may not be actuated for the first type of collision, but may be actuated for the second type of collision. By this means, the deployed knee airbag body 122a or 122c is pushed back by the biasing member 500, and therefore can immediately contact the upper body airbag body 112 deployed after the deployment of the knee airbag body 122a or 122c. Therefore, it is possible to immediately move the upper body airbag body 112 in the direction in which the collision load is applied, and consequently to protect the- head and the chest or the passenger P in the appropriate position of the passenger protection surface 112C.

In addition, another example of the use of the biasing member 500 will be described. For example, in a case where the second type of collision in the first collision direction occurs, when the collision speed detected by the ECU 201 is a first speed, the ECU 201 turns the switching member 500e off. That is, the biasing member 500 provided in the door trim 300 is not actuated. Meanwhile, in a case where the second type of collision in the first collision direction occurs, when the collision speed detected by the ECU 201 is a second speed higher than the first speed, the ECU 201 turns the switching member 500e on. That is, the biasing member 500 provided in the door trim 300 is actuated.

Here, when the collision speed is the second collision speed, the passenger P moves at a high speed due to inertia. Therefore, the upper body airbag body 112 is required to immediately move in the direction in which the collision load is applied. In this case, by actuating the biasing member 500, it is possible to shorten a period of time until the upper body airbag body 112 contacts the knee airbag body 122a or 122c, compared to when the biasing member 500 is not actuated. By this means, it is possible to immediately move the upper body airbag body 112 in the direction in which the collision load is applied, and therefore to protect the head and the chest of the passenger P in the appropriate position of the passenger protection surface 112C.

Although the present embodiment has been described, this is by no means limiting, and the embodiment may be appropriately modified as follows.

With the present embodiment, although the upper body airbag body 112 is polygonal, this is by no means limiting. For example, the upper body airbag body 112 may be circular.

With the present embodiment, although the inclined surfaces 112L and 112R arcs configured to contact the knee airbag body 122a or 122c, this is by no means limiting. The inclined surfaces 112L and 112R may have a function to protect the head and the chest of the passenger P.

With the present embodiment, the knee airbag bodies 122a to 122c deploy from the front part of the vehicle 1, but this is by no means limiting. For example, the knee airbag bodies 122a to 122c may deploy from the vehicle width direction.

With the present embodiment, the shape of the knee airbag bodies 122a and 122c is not referred, and is not limited. For example, an inclined surface may be formed in a portion of the knee airbag body 122a or 122c contacting the inclined surface 112L or 112R of the upper body airbag foody 112 to make it easy to move the upper body airbag foody 112.

With the present embodiment, although the knee inflators 121a to 121c are provided for the knee airbag bodies 122a to 122c, respectively, a single inflator may be used for the knee airbag bodies 122a to 122c. In this case, for example, a selector valve may be provided. Here, one valve corresponding to the knee airbag body to be deployed is opened, and other valves corresponding to the knee airbag bodies not to be deployed may be closed.

With the present embodiment, the knee airbag body 122b is deployed for the first type of collision, but this is by no means limiting. In addition to the knee airbag body 122b, one or both of the knee airbag bodies 122a and 122c may be deployed.

With the present embodiment, the knee airbag body 122b and one of the knee airbag bodies 122a and 122c are deployed for the second type of collision. However, this is by no means limiting, and the knee airbag body 122b and both the knee airbag bodies 122a and 122c may be deployed.

With the present embodiment, the second type of the collision is an oblique collision, but this is by no means limiting. For example, the second type of collision may be a lateral collision.

With the present embodiment, the passenger protection apparatus 101 is provided for the seat next to the driver's seat, but this is by no means limiting. The present disclosure may be applicable to the passenger protection apparatus for the driver's seat and the back seat.

With the present embodiment, the spring member 500c is used in the biasing member 500, but this is by no means limiting. For example, a rubber member may be applicable.

With the present embodiment, the knee airbag body 122a is deployed toward the center console 400, and the knee airbag body 122c is deployed toward the door trim 300, but this is by no means limiting. The upper body airbag body 112 may be deployed directly toward the center console 400 or the door trim 300 and contacts the center console 400 or the door trim 300 to protect the head and the chest of the passenger P in the appropriate position of the passenger protection surface 112C.

In one embodiment, the door trim 300 and the center console 400 may serve as an "in-vehicle component" for the deployment of the knee airbag body 122a or 122c, but this is by no means limiting as long as the in-vehicle components are located on each side of the seat 10. For example, an armrest and a shift lever are applicable.

In one embodiment, the upper body airbag body 112 may serve as a "first airbag", the knee airbag bodies 122a to 122c may serve as a "second airbag", the ECU 201 may serve as a "collision type detector", and the door trim 300 and the center console 400 may serve as an "in-vehicle component". In one embodiment, the knee airbag body 122b may serve as a "first sub-airbag", the knee airbag bodies 122a and 122c may serve as a "second sub-airbag", and the biasing member 300 may serve as a "biasing member".

According to the disclosure, it is possible to provide a passenger protection apparatus capable of further improving the safety by sufficiently protect the head and the chest of the passenger.

The invention claimed is:

1. A passenger protection apparatus for a vehicle comprising:
   a first airbag configured to deploy from a front part of the vehicle toward a passenger;
   a second airbag provided under the first airbag and configured to deploy toward the passenger; and
   a collision type detector configured to detect a collision or collision possibility of the vehicle and detect a collision type, wherein
   the collision type detector can detect a first type of collision, and a second type of collision where a collision load is applied more outward in a vehicle width direction than the first type of collision,
   the second airbag deploys in a first deployment configuration when the first type of collision is detected, and deploys in a second deployment configuration different from the first deployment, configuration when the second type of collision is detected, and
   the second airbag deployed in the second deployment configuration contacts an in-vehicle component provided in a vehicle compartment, and then the second airbag in contact with the in-vehicle component guides the first airbag in a direction in which the collision load is applied.

2. The passenger protection apparatus for the vehicle according to claim 1, wherein the deployed first airbag is polygonal in a plan view of the vehicle.

3. The passenger protection apparatus for the vehicle according to claim 2, wherein:
   a biasing member is provided in a part or a whole of the in-vehicle component; and
   the biasing member allows the in-vehicle component to move into the vehicle compartment.

4. The passenger protection apparatus for the vehicle according to claim 3, wherein
   the second airbag includes a plurality of sub-airbags,
   the plurality of sub-airbags includes a first sub-airbag that is configured to be deployed in the first deployment configuration,
   the plurality of sub-airbags includes a second sub-airbag, and the first sub-airbag and the second sub-airbag are configured to be deployed in the second deployment configuration, and
   the deployed second sub-airbag guides the first: airbag in the direction in which the collision load is applied.

5. The passenger protection apparatus for the vehicle according to claim 4, wherein the second sub-airbag is deployed in the second deployment configuration, the second sub-airbag being provided in a side opposite to the direction in which the collision load is applied in the vehicle width direction.

6. The passenger protection apparatus for the vehicle according to claim 2, wherein
   the second airbag includes a plurality of sub-airbags,
   the plurality of sub-airbags includes a first sub-airbag that is configured to be deployed in the first deployment configuration,
   the plurality of sub-airbags includes a second sub-airbag, and the first sub-airbag and the second sub-airbag are configured to be deployed in the second deployment configuration, and
   the deployed second sub-airbag guides the first airbag in the direction in which the collision load is applied.

7. The passenger protection apparatus for the vehicle according to claim 6, wherein the second sub-airbag is deployed in the second deployment configuration, the second sub-airbag being provided in a side opposite to the direction in which the collision load is applied in the vehicle width direction.

8. The passenger protection apparatus for the vehicle according to claim 1, wherein:
   a biasing member is provided in a part or a whole of the in-vehicle component; and
   the biasing member allows the in-vehicle component to move into the vehicle compartment.

9. The passenger protection apparatus for the vehicle according to claim 8, wherein
   the second airbag includes a plurality of sub-airbags,
   the plurality of sub-airbags includes a first sub-airbag that is configured to be deployed in the first deployment configuration,
   the plurality of sub-airbags includes a second sub-airbag, and the first sub-airbag and the second sub-airbag are configured to be deployed in the second deployment configuration, and
   the deployed second sub-airbag guides the first airbag in the direction in which the collision load is applied.

10. The passenger protection apparatus for the vehicle according to claim 9, wherein the second sub-airbag is deployed in the second deployment configuration, the second sub-airbag being provided in a side opposite to the direction in which the collision load is applied in the vehicle width direction.

11. The passenger protection apparatus for the vehicle according to claim 1, wherein
    the second airbag includes a plurality of sub-airbags,
    the plurality of sub-airbags includes a first sub-airbag that is configured to be deployed in the first deployment configuration,
    the plurality of sub-airbags includes a second sub-airbag, and the first sub-airbag and the second sub-airbag are configured to be deployed in the second deployment configuration, and
    the deployed second sub-airbag guides the first airbag in the direction in which the collision load is applied.

12. The passenger protection apparatus for the vehicle according to claim 11, wherein the second sub-airbag is deployed in the second deployment configuration, the second sub-airbag being provided in a side opposite to the direction in which the collision load is applied in the vehicle width direction.

13. A passenger protection apparatus for a vehicle comprising:
    a first airbag configured to deploy from a front part of the vehicle toward a passenger;
    a second airbag provided under the first airbag and configured to deploy toward the passenger; and
    circuitry configured to detect a collision or collision possibility of the vehicle and detect a collision type, wherein
    the circuitry can detect a first type of collision, and a second type of collision where a collision load is applied more outward .in a vehicle width direction than the first type of collision,
    the second airbag deploys in a first deployment configuration when the first type of collision is detected, and deploys in a second deployment configuration different from the first deployment configuration when the second type of collision is detected, and
    the second airbag deployed in the second deployment configuration contacts an in-vehicle component provided in a vehicle compartment, and then the second airbag in contact with the in-vehicle component guides the first airbag in a direction in which the collision load is applied.

\* \* \* \* \*